(No Model.)
J. H. HAYES & H. K. NASH.
BICYCLE TIRE.
No. 590,152. Patented Sept. 14, 1897.
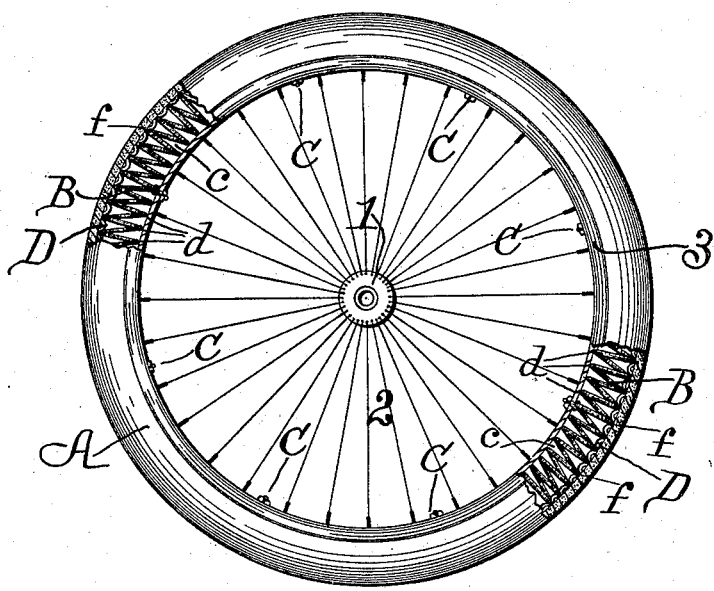
FIG-1-
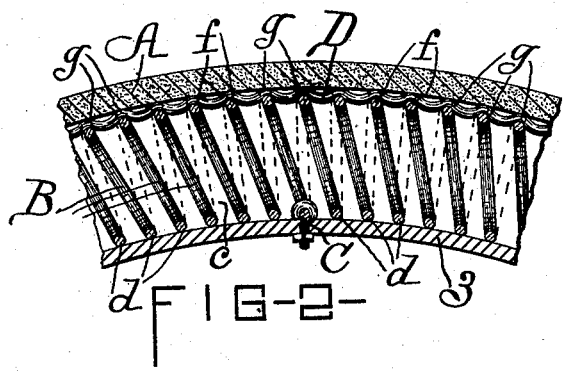
FIG-2-
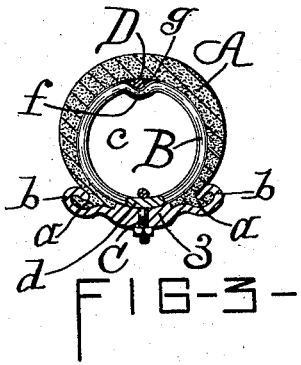
FIG-3-
FIG-4-
ATTEST—
Conrad Schornick.
H. B. McKee
INVENTORS—
John H. Hayes, and
Henry K. Nash,
By Wm. C. Raymond,
their Attorney

UNITED STATES PATENT OFFICE.

JOHN H. HAYES AND HENRY K. NASH, OF DE RUYTER, NEW YORK.

BICYCLE-TIRE.

SPECIFICATION forming part of Letters Patent No. 590,152, dated September 14, 1897.

Application filed November 13, 1895. Renewed July 20, 1897. Serial No. 645,289. (No model.)

*To all whom it may concern:*

Be it known that we, JOHN H. HAYES and HENRY K. NASH, citizens of the United States, residing at De Ruyter, in the county of Madison and State of New York, have invented certain new and useful Improvements in Bicycle-Tires; and we do hereby declare the following to be a full, clear, and exact description of the invention, such as will enable others skilled in the art to which it appertains to make and use the same, reference being had to the accompanying drawings, in which—

Figure 1 is an elevational view of our improved bicycle-tire as applied to the wheel of a bicycle or analogous vehicle and representing portions of the wheel-rim and the tire broken away and sectional for illustration of internal parts. Fig. 2 is an enlarged detail showing in longitudinal section a segmental part of our tire and the wheel-rim circumferentially bounded thereby. Fig. 3 denotes a cross-sectional enlarged detail of our tire and the supporting-rim of a wheel; and Fig. 4 is a fragmentary detail side elevation illustrative of a spirally-coiled spring of modified form from that embodied in the preceding figures of the drawings.

Throughout the several views of the drawings like letters and figures of denotation indicate corresponding parts.

Our invention has reference, broadly, to that class of vehicle-wheel tires ordinarily denominated as "cushioned tires," and wherein elasticity and resiliency of the tire structure are attained in varied ways.

The prime object of our present invention is the production of a unique construction of cushioned or elastic tire of non-pneumatic form especially adaptable for utilization upon the rims of bicycle-wheels, and yet also more or less applicable for employment in connection with sulky-wheels and other wheels pertaining to light road-vehicles; and, furthermore, our purpose is the attainment of an elastic tire possessing requisite durability, elasticity, and strength, exceedingly simple in construction and comparatively inexpensive to manufacture, not liable to get out of order or proper operation by accident or hard usage, and readily attachable to or detachable from the rim of a wheel.

Our invention consists in the novel features of construction, arrangement, coworking of parts, and operation hereinafter described, and which are concisely set forth in the hereunto annexed claims.

Referring to the accompanying drawings, 1 denotes the hub of a bicycle-wheel, 2 the radial spokes, and 3 the tire-carrying rim of the wheel, of the formation shown or other desirable shape, and of metal or wood, as preferred.

A is a longitudinally-split wrapper or shoe, composed of india-rubber or other satisfactory elastic material, of segmental shape transversely and of a circular continuous form longitudinally, and by its parallel lockable edges *a a*, of flange-like shape, retained firmly to the periphery of the rim 3 by means of the interlocking lateral flanges *b b* of the metallic rim gripping same.

As we make no claim to any specific manner of securing the elastic shoe or tube to the rim of a wheel, merely showing, by way of exemplification, one reliable means of attachment, obviously any suitable or preferred means may be employed for the immovable or detachable connection of our elastic shoe or wrapper to the wheel's rim.

B indicates a continuous spirally-coiled spring of a diameter in cross-section adapting it to snugly occupy the bore or opening *c* of the tubular-like elastic cover or shoe A, and extending continuously throughout the circular length thereof, the meeting ends of the spring being welded or otherwise connected to create the annular-shaped spring member.

The helices of the spring B may be in cross-section circular, as illustrated in the first three figures of our drawings, or rectangular, as indicated in detail, Fig. 4, or as otherwise deemed desirable.

Preferably the spring B at its inner peripheral boundary lies longitudinally central directly against the bearing-face of the rim of the wheel, as denoted by the letters *d*, such abuttal directly against the unyielding rim insuring a solid and positive seat for the helices comprising such spring.

Of course whenever so wished, and evidently in cases wherein the elastic wrapper lies against the whole of the bearing-face of the rim, the spring B would necessarily bear indirectly upon said rim, owing to the interposed portion of the wrapper or shoe.

C are threaded eyebolts for securely holding the spring to the periphery of the rim 3, the eyes of the bolts grasping at intervals the spring-helices, and the shanks penetrating through therim are rigidly yet removably retained in place by suitable nuts.

Along its tread portion and longitudinally central a trough is formed in the spring B through the formation an outstanding depression or loop by proper bending or stamping of the helices of the spring, said slightly-depressed seats $f$, created in the helices, being lineal throughout the peripheral tread of the spring member.

D denotes a continuous longitudinal annular-like wire member, corrugated or wavy throughout its length and fitted snugly around the tread of the wire spring B, along its crimps or depressions $f$, each outstanding loop $g$ of the corrugated binding member D passing over and partially encircling a subjacent depressed portion $f$ of a helix of said spring and firmly held to their respective seats. The function of our annular-like corrugated member D is of exceeding importance, for the reason that the helices of the spring B are at their tread portions absolutely retained at equal and unchanging distances apart, whereby no creeping is possible, and a reliable and thorough tread bearing-surface assured to the continuous spring against its elastic shoe A, and any internal wear of said covering from otherwise certain frictional rubbing of the helices is an impossibility.

Our means for the retention of the tread of the spring B against creeping permits of the employment of wire of small transverse diameter for a spring, as is readily apparent.

Continued tests of our construction of tire in conjunction with the wheels of a bicycle has demonstrated to our satisfaction the utility, practicability, and serviceability thereof.

Having described our invention, what we claim as new, and desire to secure by Letters Patent, is—

A tire for vehicle-wheels comprising a tubular-like or segment-shaped wrapper or shoe of annular form longitudinally, constructed of elastic material, a continuous spirally-coiled spring of a diameter readily fitting the interior of the shoe, the shoe suitably secured to the rim of a wheel, and the spring connected to the rim by eyebolts held in place by nuts bearing against the non-bearing face thereof, depressions in the tread of the spring lineal its periphery, and an annular band of corrugated form longitudinally, tightly fitting the spring at its depressed portions and lockingly retaining the helices of the spring from longitudinal displacement at their treads, all combined and operating substantially as described.

In testimony whereof we affix our signatures, in presence of two witnesses, this 19th day of August, 1895.

JOHN H. HAYES. [L. S.]
HENRY K. NASH. [L. S.]

Witnesses:
WM. C. RAYMOND,
M. L. TRAVIS.